(122.)

G. C. E. Weber.
Railway Car Coupling.

No. 122,690. Patented Jan. 9, 1872.

Inventor.
Gustav C. E. Weber.

Witnesses.
J. H. Burridge.
L. Humphreys

UNITED STATES PATENT OFFICE.

GUSTAV C. E. WEBER, OF CLEVELAND, OHIO.

IMPROVEMENT IN CAR-COUPLINGS.

Specification forming part of Letters Patent No. 122,690, dated January 9, 1872.

*To all whom it may concern:*

Be it known that I, GUSTAV C. E. WEBER, of Cleveland, in the county of Cuyahoga and State of Ohio, have invented a certain new and Improved Railway Car-Coupling; and I do hereby declare that the following is a full, clear, and complete description thereof, reference being had to the accompanying drawing making part of the same.

SPECIFICATION.

Figure 1:
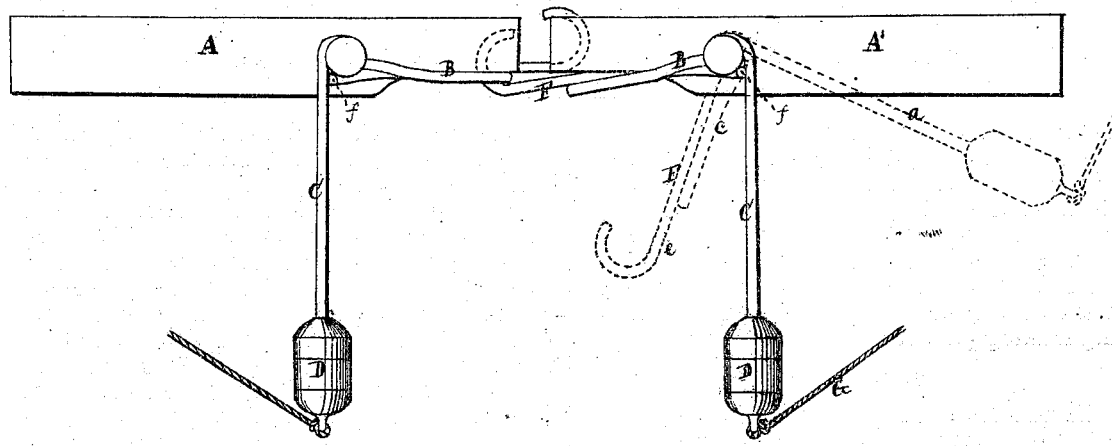
Figure 2:
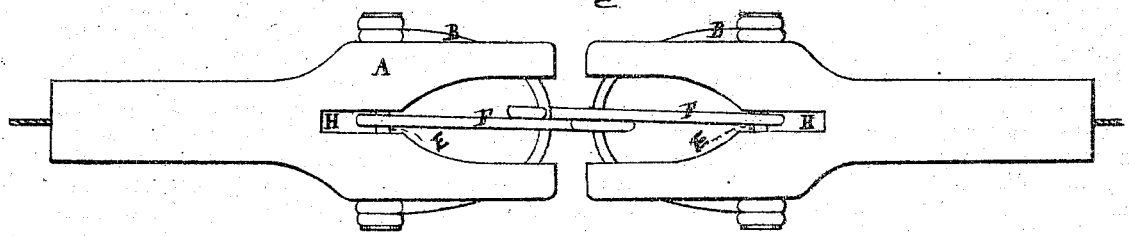
Figure 3:
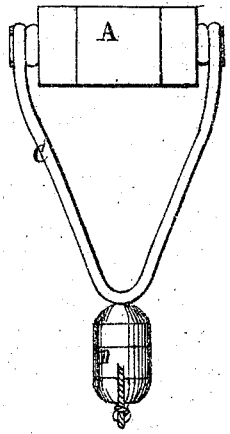

Figure 1 is a side view of the coupling. Fig. 2 is a plan view. Fig. 3 is an end view.

Like letters of reference refer to like parts in the several views.

The nature of this invention relates to a railway car-coupling; and the object of the same is to so construct said coupling that it can be coupled and uncoupled without going between the cars for that purpose, thereby avoiding accident to those having the duty to perform of coupling up the train.

The construction and operation of said coupling are as follows:

In the drawing, A A' represents the bunters of the coupling, which may be of the shape, or a modification thereof, as shown. B is a link pivoted to the sides of the bunters, as shown in Fig. 2, which allows to it a swinging or vibratory movement, for a purpose presently shown. To the pivot of the link B is also attached a yoke, C, Fig. 3, to the lower end of which is attached a weight, D. To the bolt E, which is also the pivotal axis of the link and yoke, is secured the hook F, whereby the two sections of the coupling are connected.

The practical operation of this coupling is as follows: Each section A of the coupling is attached to the under side of the platform of a car in the ordinary position and by any appropriate means. The relative position of the two sections to each other when thus connected to the cars is such as shown in Figs. 1 and 2, which represent the two sections as being coupled together. In order to uncouple the cars, the operator draws upon the cord G, which is carried above the platform within his reach. This drawing upon the cord elevates the weight of section A' to the position indicated by the line *a*, Fig. 1, which will allow the link B to drop to the position indicated by the dotted line *c*, and the hook F, resting thereon, to fall therewith, as indicated by the dotted lines *c*, which becomes disengaged from the link B of the section A. The link B is forced upward and continued in a horizontal position by means of the weight D and yoke. Said yoke and link having one common pivotal axis, the yokes, on falling from the position indicated by the dotted lines *a* to that shown by the drawing, force the link upward by its contact with the lugs *f*, projecting from each arm of the link near its pivotal connection with the bunter, and upon which lugs the links rest, and are thereby sustained in the horizontal position shown in Figs. 1 and 2, and in which position one or the other of the links must be in order to be caught by the hook of the corresponding section of the coupling. Said hook is connected to the pivotal bolt by an elongated eye, so that when the point of the hook is lowered it will drop or slide so far forward as to allow it to catch upon the link. The elongated eye also allows a longitudinal movement of the hooks, providing by this means a slack in the end movement of the coupling, so that the connection can be made without the cars being very close together, and also to adapt the coupling to the sudden and unequal movement of the several cars linked up. A lateral movement is also obtained to the hook by its not being too confined in the slot H; hence the hook will adapt itself to the swaying motion of the running cars, and thereby avoid unnecessary lateral strain.

Claim.

What I claim as my invention, and desire to secure by Letters Patent, is—

Links B having lugs *f*, weighted lever or yoke C separate therefrom but hung to the same axial points outside of the heads A, hooks F hung to the bolt E between the axial points of the links B, and lever or yoke C, all constructed and arranged to operate in the manner as and for the purpose set forth.

GUSTAV C. E. WEBER.

Witnesses:
J. H. BURRIDGE,
G. A. DODGE.

(122)